United States Patent [19]
Orlando et al.

[11] Patent Number: 5,708,424
[45] Date of Patent: Jan. 13, 1998

[54] WIRELESS REMOTE FUEL GAUGE

[76] Inventors: Vincent Orlando, 500 Azalea Rd., Mattituck, N.Y. 11952; Richard Cannarella, 8 Douglas La., Manorville, N.Y. 11949

[21] Appl. No.: 699,398

[22] Filed: Aug. 19, 1996

[51] Int. Cl.$^6$ .................................................. G08B 71/00
[52] U.S. Cl. ................... 340/870.08; 340/618; 340/623; 364/509; 364/465; 73/317
[58] Field of Search ........................ 340/870.08, 618, 340/623; 364/509, 465; 73/317; 222/62

[56] References Cited

U.S. PATENT DOCUMENTS

| | | | |
|---|---|---|---|
| 4,147,893 | 4/1979 | Matson | 379/99 |
| 4,845,486 | 7/1989 | Knight | 340/618 |
| 5,265,032 | 11/1993 | Patel | 364/509 |
| 5,289,369 | 2/1994 | Hirshberg | 395/213 |
| 5,359,522 | 10/1994 | Ryan | 364/465 |
| 5,423,457 | 6/1995 | Nicholas | 222/62 |
| 5,483,826 | 1/1996 | Schultz | 73/146.5 |
| 5,619,560 | 4/1997 | Shea | 379/106 |

*Primary Examiner*—Jeffery Hofsass
*Assistant Examiner*—Albert K. Wong
*Attorney, Agent, or Firm*—Michael I. Kroll

[57] ABSTRACT

The present invention relates to a wireless remote fuel gauge (10) comprising a tank gauge (12) positioned on a fuel tank (16A, 16B). The tank gauge (12) comprises a tank gauge microprocessor/analog converter (12A) electrically connected to a tank gauge power line (12F). A tank gauge transmitter (12B) is electrically connected to the tank gauge microprocessor/analog converter (12A). The tank gauge transmitter (12B) functions to transmit, by radio frequency, a level of fuel (18) information within the fuel tank (16A, 16B). A tank gauge indicator (12D) is mechanically connected to the tank gauge microprocessor/analog converter (12A). The tank gauge indicator (12D) functions to allow a consumer to visually monitor the level of fuel (18) within the fuel tank (16A, 16B). The tank gauge float (12G) maintains position on the level of fuel (18) within the fuel tank (16A, 16B). A remote unit (14) in radio frequency communication with the tank gauge (12) is positioned within a house (22) preferably within a hallway (22A, 22B). The remote unit (14) comprises a remote unit microprocessor (14A) electrically connected to a remote unit power line (14F). A remote unit transmitter (14B) is electrically connected to the remote unit microprocessor (14A). The remote unit transmitter (14B) functions to transmit, by wireless communication, a request for the level of fuel (18) information to the pre-existing tank gauge (12C). A remote unit receiver (14C) is electrically connected to the remote unit microprocessor (14A). The remote unit receiver (14C) functions to receive the level of fuel (18) information from the tank gauge transmitter (12B). A remote unit indicator (14D) is electrically connected to the remote unit microprocessor (14A). The remote unit indicator (14D) functions to visually exhibit the level of fuel (18) information to a user. A remote unit wireless communication means (14G) electrically connected to the remote unit microprocessor (14A). The remote unit wireless communication means (14G) functions to receive therethrough a request for the level of fuel (18) from a fuel company and transmit therethrough the level of fuel (18) to the fuel company.

4 Claims, 6 Drawing Sheets

WIRELESS REMOTE FUEL GAUGE

BACKGROUND OF THE INVENTION

1. Field of the Invention

The present invention relates to a wireless remote fuel gauge. More particularly, the present invention relates to a wireless remote fuel gauge having a tank gauge which communicates fuel tank information to a remote unit. An added feature is that the remote unit which can communicate fuel tank information to a monitoring location, such as an oil company via a wireless communication means.

2. Description of the Prior Art

The wireless remote fuel gauge system is perfect for the budget conscience homeowners. It is simple to install, attaches to the existing fuel tank gauge, and the remote trait is simply secured next to the existing thermostat. No additional wiring is required. The homeowner can monitor the exact quantity of fuel oil to maximize discountability when ordering fuel oil.

The principle reasons for installing the added feature is that the oil company can determine the exact amount of fuel in a consumer's tank prior to filling which allows the fuel company to deliver the proper amount of fuel during rationing conditions and/or deliver a maximum amount of fuel during maximum profiting conditions. Now in today's environmental problems and regulations, fuel oil companies will know exactly how much fuel oil is required for delivery. This knowledge will help oil companies to cut costs in spill clean ups, insurance premiums, and unnecessary fuel stops. Having such accurate knowledge of exact inventory levels of the consumer's fuel permits the fuel company to maximize their profit by buying large quantities of fuel at the wholesale level at the lowest price available which in turn yields maximum net profit and minimally buying fuel at artificially high prices which minimizes profit potential. The majority of present day systems are expensive and require emptying of the fuel tank prior to installation. Other systems are simplified and only alert a user or monitoring company when the fuel drops below a pre-determined level and requires filling. These systems do not have constant inventory control monitoring capabilities and are alarm activated type systems. Other systems are manually operated manometers which the consumer must read regularly. Most consumers find these systems time consuming and difficult to utilize since they require the consumer to go to the fuel tank and manually take a reading. Still other systems require a constant supply of air pressure to an oil tank in order to provide an accurate fuel level reading. Therefore, there exists a need for an inexpensive fuel monitoring system which can intermittently transmit inventory level to a remote location.

Numerous innovations for fuel monitoring systems have been provided in the prior art that are described as follows. Even though these innovations may be suitable for the specific individual purposes to which they address, they differ from the present invention as hereinafter contrasted.

In U.S. Pat. No. 4,134,022, titled, FREQUENCY SENSITIVE LEVEL DETECTING APPARATUS, by inventor, Jacobson, a level sensing apparatus is disclosed having a source for supplying a signal at predetermined frequency is described and claimed. In U.S. Pat. No. 4,387,594, titled, WATER LEVEL INDICATOR HAVING A REMOTE AND LOCAL READOUT DISPLAY, by inventor, Berhold, a water level indicating apparatus for establishing an optical signal indicative of water level which signal is plat by a beam splicer is described. In U.S. Pat No. 5,257,539, titled, ELECTRONIC OIL LEVEL INDICATOR, by inventor, Gale, an electronic oil level indicator is provided to show the amount of oil in an oil pan of an internal combustion engine which consists of a perforated housing positioned in the oil pan is disclosed and claimed. In U.S. Pat. No. 3,818,192, titled, REMOTE CONTROL AND DISPLAY FOR A LIQUID DISPENSING SYSTEM, by inventor, Anderson et al., an electronic calculator and control system for a gasoline dispenser or the like for remotely controlling the dispenser and displaying the accumulated sale and/or volume is described. In U.S. Pat. No. 5,261,276, titled, FUEL MONITOR SYSTEM AND METHOD, by inventor, Gifford, a system and method for providing remote readings of liquid levels in an oil tank is described. The above patented inventions differ from the present invention because they all lack one or more of the following features such as a tank gauge adapts to the existing gauge and it's wireless to the remote display. The above patented inventions further lack a remote unit having a remote unit microprocessor which is electronically connected to the following:

a) remote unit microprocessor,
b) remote unit receiver,
c) remote unit indicator,
d) remote unit wireless communication means.

Numerous innovations for fuel gauges have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a wireless remote fuel gauge. More particularly, the present invention relates to a wireless remote fuel gauge having a tank gauge which communicates fuel tank information to a remote unit an added feature is the remote unit which can communicate fuel tank information to a monitoring location, such as an oil company via a remote unit wireless communication means.

The types of problems encountered in the prior art are fuel gauges are limited in their functionality.

In the prior art, unsuccessful attempts to solve this problem were attempted namely: mechanical indicating means and expensive electronic fuel level measuring means. However, the problem was solved by the present invention because it is easily installed without removal of the existing fuel gauge from the tank as well as inexpensive.

Innovations within the prior art are rapidly being exploited in the field of remote monitoring fuel levels in consumer fuel tanks.

The present invention went contrary to the teaching of the an which describes systems which are simplified in automobile only alerting a user or monitoring company when the fuel drops below a pre-determined level and requires filling.

The present invention solved a long felt need for an easy installable inexpensive remote monitoring fuel gauge system.

The present invention produced unexpected results namely: home owners can take advantage of C.O.D. prices of fuel oil and order as needed. Net profits were increased by the fuel companies which monitor the consumer fuel levels utilizing the present invention.

A synergistic effect was produced utilizing the present invention due to the following facts and results from experimentation: consumers could add a sufficient amount of fuel to their fuel tank to suffice when the price is high and fill the fuel tank when the price is low which averages out to a lower mean average of fuel price in any given year.

Accordingly, it is an object of the present invention to provide a wireless remote fuel gauge.

More particularly, it is an object of the present invention to provide a wireless remote fuel gauge which comprises at least one tank gauge and at least one remote unit which communicate information to each other utilizing radio frequency.

In keeping with these objects, and with others which will become apparent hereinafter, one feature of the present invention resides, briefly stated, the existing tank gauge remains in place, the wireless remote gauge adapts to the existing gauge and is powered by house current reduced to low voltage.

When the tank gauge is designed in accordance with the present invention, a tank gauge transmitter converts analog movements to digital bits which in turn are converted to a radio signal.

In accordance with another feature of the present invention, a tank gauge remote receiver receives the radio frequency signal and decodes thus displaying the signal to LEDs or a LCD display.

Another feature of the present invention is that a tank gauge indicator is mechanically connected to the electrically connected tank gauge transmitter.

Still another feature of the present invention is that a tank gauge is a low voltage transmitter to meet any explosion hazard codes.

Yet still another feature of the present invention is that the remote unit can be a separate unit or can be incorporated into a new digital thermostat.

Still yet another feature of the present invention is that a remote unit receiver, which receives information via radio frequency from the tank gauge transmitter, is battery powered and receives a 24 or 110 volt back up power source from the pre-existing thermostat wiring An added feature of the present invention is that a remote unit receiver, which communicates information via radio frequency from the tank gauge transmitter, is electronically connected to the remote unit microprocessor.

Yet another feature of the present invention is that a remote unit indicator is electronically connected to the remote unit microprocessor.

Still another feature of the present invention is that the remote unit indicator comprises: a remote unit empty indicator, a remote unit ¼ indicator, a remote unit ½ indicator, a remote unit ¾ indicator, and a remote unit full indicator or a LCD numerical display.

Another feature of the present invention is that a remote unit wireless communication means, functioning to transmit and receive information from a fuel monitoring company, is electronically connected to the remote unit microprocessor.

The novel features which are considered characteristic for the invention are set forth in the appended claims. The invention itself, however, both as to its construction and its method of operation, together with additional objects and advantages thereof; will be best understood from the following description of the specific embodiments when read and understood in connection with the accompanying drawings.

BRIEF LIST OF REFERENCE NUMERALS
UTILIZED IN THE DRAWING

10—wireless remote fuel gauge (10)
12—tank gauge (12)
12A—tank gauge microprocessor/analog converter (12A)
12B—tank gauge transmitter (12B)
12C—pre-existing tank gauge (12C)
12D—tank gauge indicator (12D)
12E—tank gauge fill line (12E)
12F—tank gauge power line (12F)
12G—tank gauge float (12G)
14—remote unit (14)
14A—remote unit microprocessor (14A)
14B—remote unit transmitter (14B)
14C—remote unit receiver (14C)
14D—remote unit indicator (14D)
14DA—remote unit empty indicator (14DA)
14DB—remote unit ¼ indicator (14DB)
14DC—remote unit ½ indicator (14DC)
14DD—remote unit ¾ indicator (14DD)
14DE—remote unit full indicator (14DE)
14EB—remote unit thermostat adjustment means (14EB)
14F—remote unit power line (14F)
14G—remote unit wireless communication means (14G)
16A—above ground fuel tank (16A)
16B—in ground fuel tank (16B)
18—fuel (18)
20—furnace/hot water heater (20)
22—house (22)
22A—house upstairs hall way (22A)
22B—house downstairs hall way (22B)
22C—house basement (22A)
24—ground (24)

DESCRIPTION OF THE PREFERRED
EMBODIMENT

Figure 1:
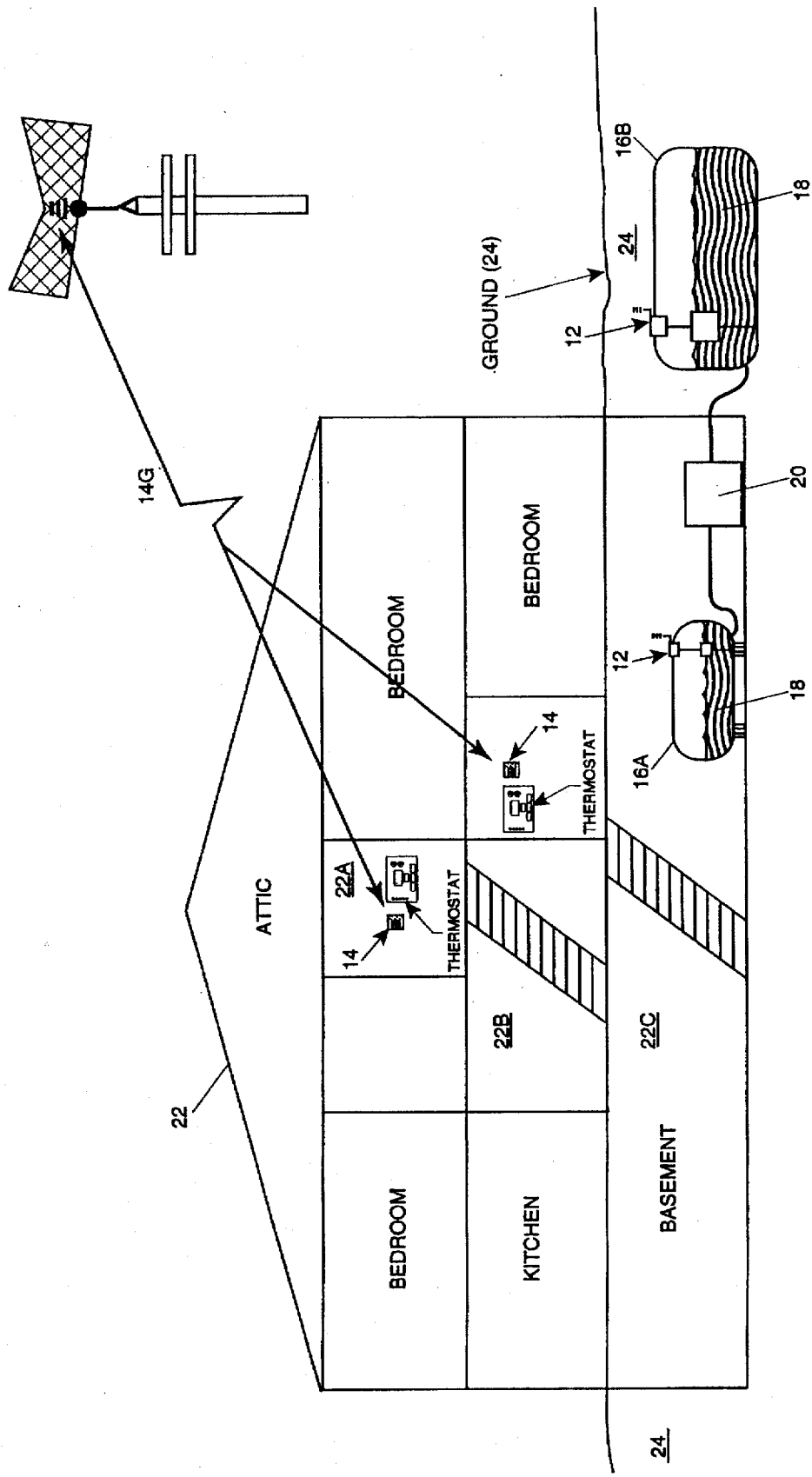
FIG. 1 is a cross sectional view of a house (22) exhibiting an wireless remote fuel gauge (10) which comprises both an above ground fuel tank (16A) in the house basement (22C) and an in ground fuel tank (16B) which both have a tank gauge (12) that transmits fuel level information to a remote unit (14) which is preferably located in a house upstairs hall way (22A) and/or a house downstairs hall way (22B) adjacent to a pre-existing thermostat which in turn communicates the fuel level information to either the homeowner or using the added feature a monitoring fuel company via a remote unit wireless communication means (14G).

Firstly, referring to FIG. 1 which is a cross sectional view of a house (22) exhibiting a wireless remote fuel gauge (10) which comprises both an above ground fuel tank (16A) in the house basement (22C) and an in ground fuel tank (16B) located in the ground (24) which both have a tank gauge (12) that transmits fuel level information to a remote unit (14) which is preferably located in a house upstairs hall way (22A) and/or a house downstairs hall way (22B) adjacent to the existing thermostat which in turn communicates the fuel level information to either the homeowner or utilizing an added feature to a monitoring fuel company via a remote unit wireless communication means (14G). The above ground fuel tank (16A) in the house basement (22C) and the in ground fuel tank (16B) are connected to a furnace/hot water heater (20) having a variable consumption based on degree days of inclement weather conditions. The tank gauge (12) transmits fuel level information to the remote unit (14) via radio frequency. The tank gauge (12) has a tank gauge transmitter (12B) which transmits a radio transmission from the fuel tank (16A, 16B ) to the remote unit receiver (14C) receiving the fuel level within the fuel tank (16A, 16B). The tank gauge (12) determines the exact fuel level and transmits the information via a tank gauge transmitter (12B) to a remote unit receiver (14C) which displays the information thereon or with the added feature can retransmit the fuel level information to a monitoring fuel company via a remote unit wireless communication means (14G).

Figure 2:
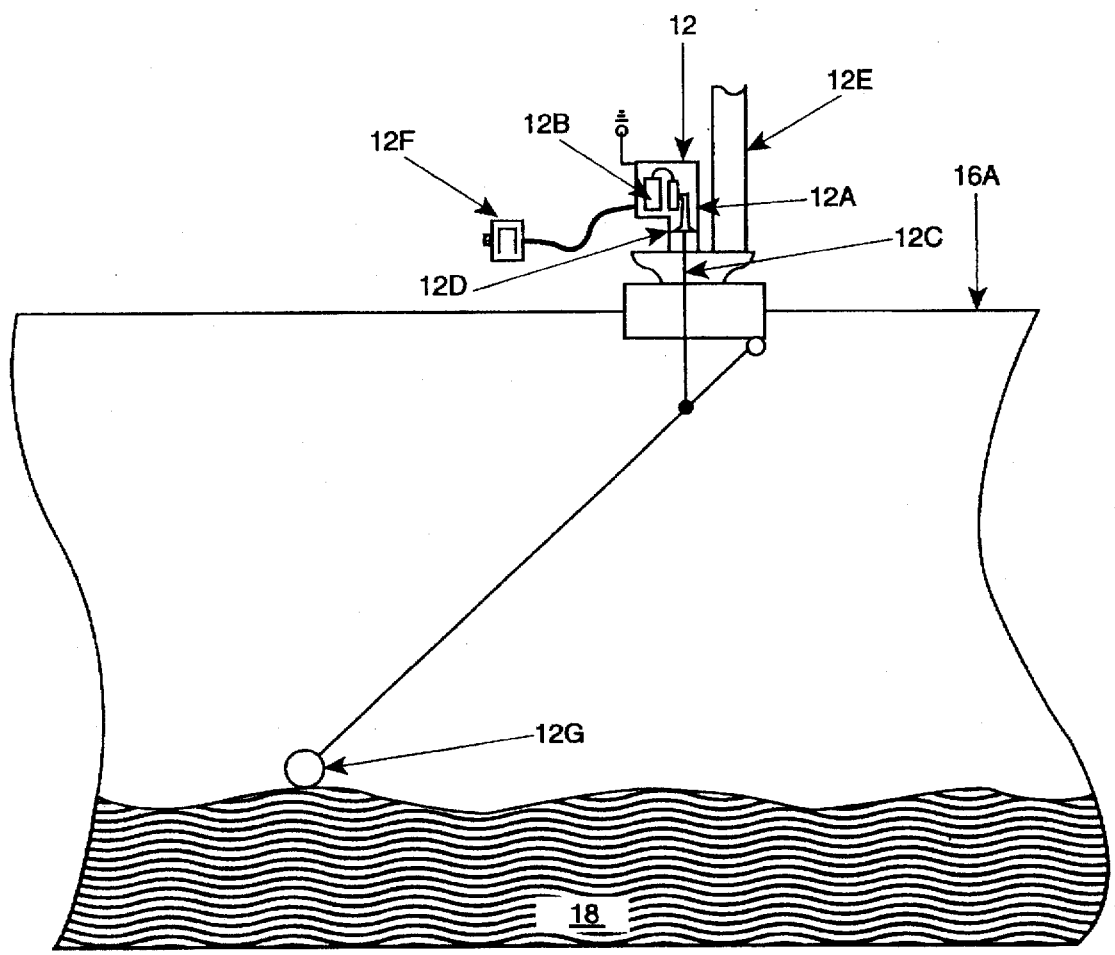
FIG. 2 is a partial cross sectional view of an above ground fuel tank (16A) exhibiting the tank gauge (12) having a tank gauge float (12G) at a level of the fuel (18).
Figure 3A:
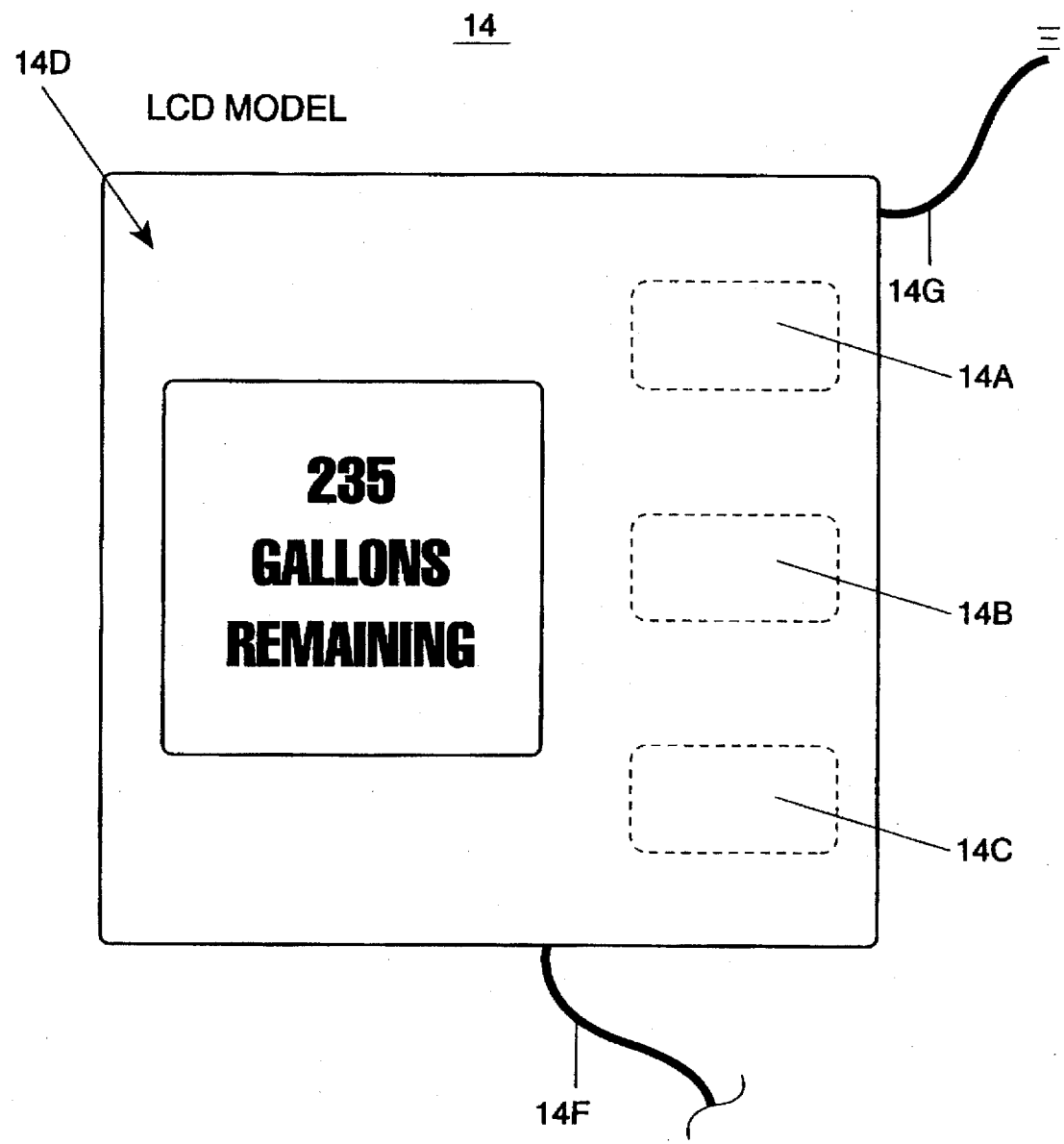
FIG. 3A is a front view of a remote unit (14) LCD embodiment.
Figure 3B:
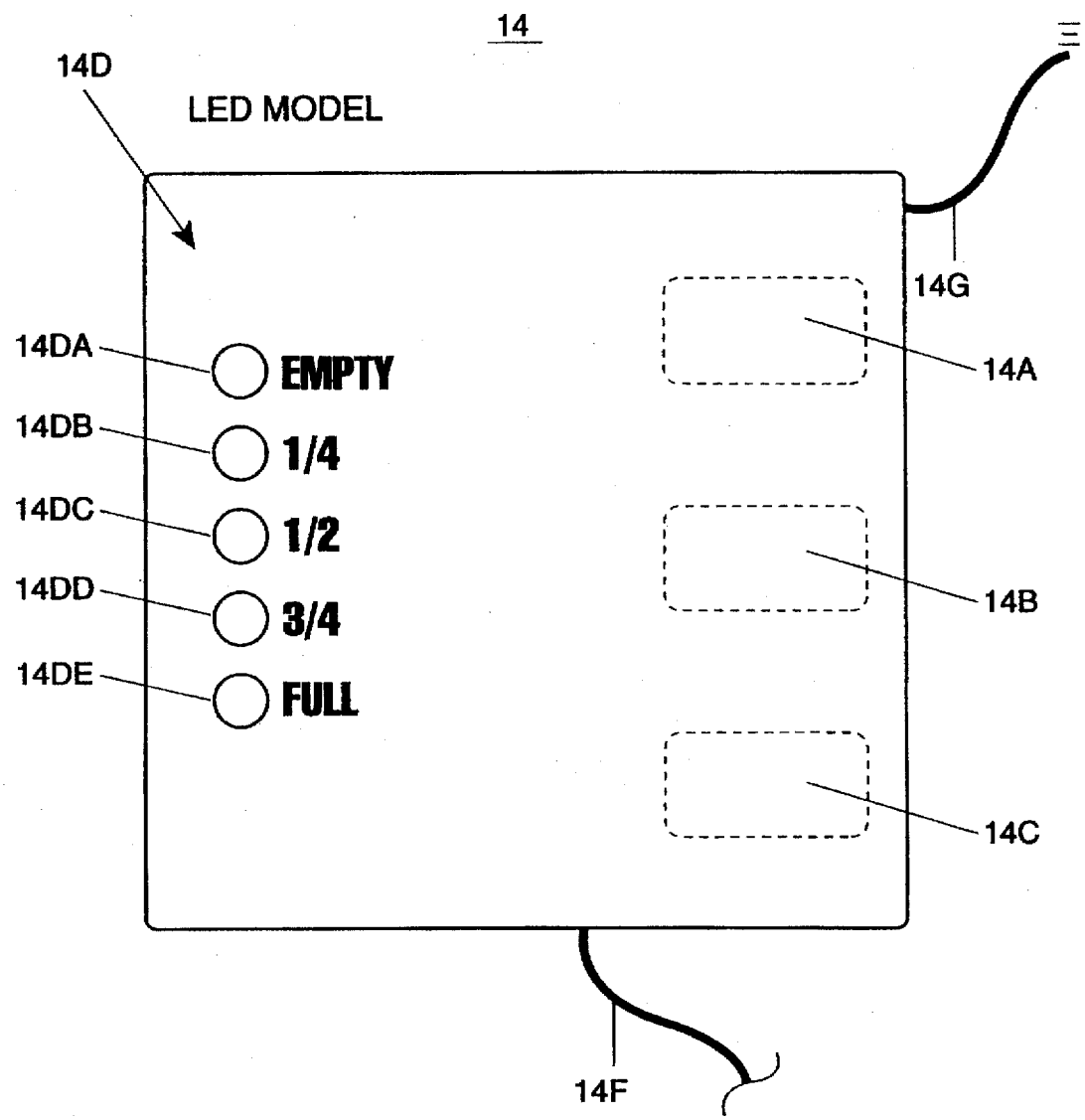
FIG. 3B is a front view of a remote unit (14) LED embodiment.
Figure 3C:
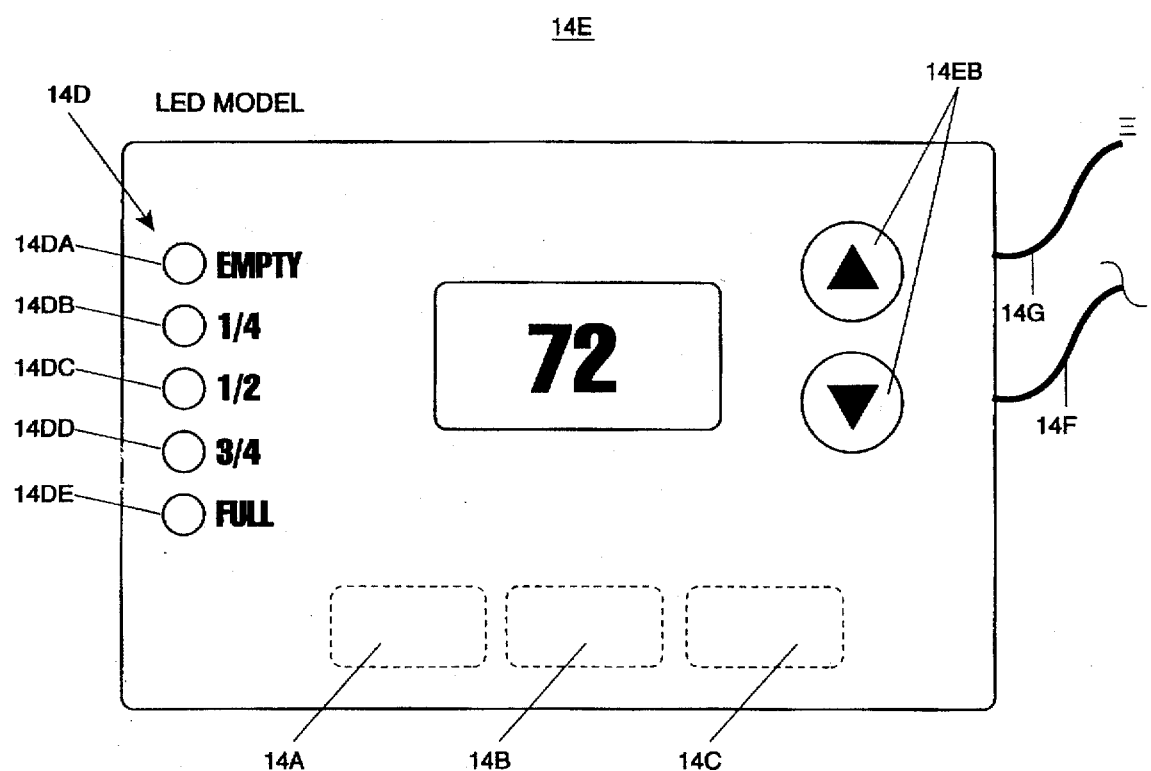
FIG. 3C is a from view of a remote unit (14) LED embodiment with a thermostat incorporated therein.
Figure 3D:
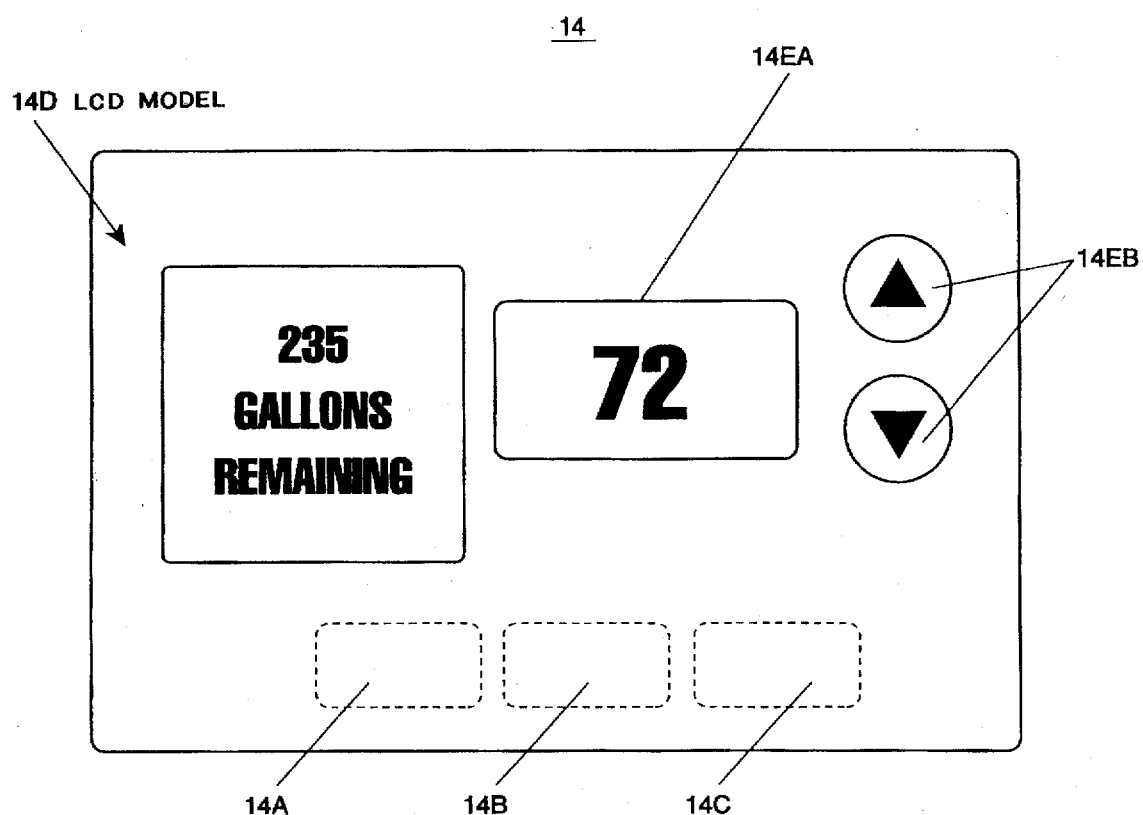
FIG. 3D is a front view of a remote unit (14) LCD embodiment with a thermostat incorporated therein.

Referring to FIG. 2 which are a partial cross sectional view of an above ground fuel tank (16A). In FIG. 2 the tank gauge (12) is exhibited having a tank gauge float (12G) at a level of the fuel (18). The tank gauge (12) comprises a tank gauge microprocessor/analog converter (12A) which is electrically connected to house current which has been reduced to low voltage. The tank gauge transmitter (12B) is electrically connected to the tank gauge microprocessor/analog converter (12A). A tank gauge indicator (12D), which functions as a visual means by which a consumer can view the fuel level, is mechanically connected to the tank gauge microprocessor/analog converter (12A). The pre-existing freely moving tank gauge float (12G) is positioned thereon which is maintained at the level of the fuel (18) within the fuel tank (16A, 16B). The tank gauge microprocessor/analog converter (12A) constantly monitors the tank gauge float (12G) at the level of the fuel (18).

Lastly referring to FIG. 3A, FIG. 3B, FIG. 3C, and FIG. 3D which are a from view of a remote unit (14) with a LCD display, LED display, LED display with thermostat, and LCD display with thermostat, respectively, which comprise a remote unit microprocessor (14A) electrically connected to a remote unit power line (14F) which is either electrically connected to a battery or a 24/110 volt volt power source from pre-existing thermostat. The remote unit transmitter (14B) and the remote unit receiver (14C) are electrically connected to the remote unit microprocessor (14A). A remote unit indicator (14D) is electrically connected to the remote unit microprocessor (14A). The remote unit indicator (14D) functions to visually display the level of fuel (18) within the fuel tank (16A, 16B). The remote unit indicator (14D) comprises a remote unit empty indicator (14DA), a remote unit ¼ indicator (14DB), a remote unit ½ indicator (14DC), a remote unit ¾ indicator (14DD), and a remote unit full indicator (14DE) or a LCD numerical display. Each of the remote unit indicators (14DA, 14DB, 14DC, 14DD, 14DE), or a LCD numerical display, preferably consists of a light electrically connected to the remote unit microprocessor (14A) and indica indicating the fuel (18) level adjacent to the light. The remote unit microprocessor (14A) illuminates one of the remote unit indicators (14DA, 14DB, 14DC, 14DD, 14DE), or a LCD numerical display, in relation to the level of fuel (18) within the fuel tank (16A, 16B).

In addition, the remote unit (14) may have a standard remote unit thermostat (14E) with a remote unit thermostat display (14EA) displaying the temperature present in the house (22). Remote unit thermostat adjustment means (14EB), electrically connected to the standard remote unit thermostat (14E), may also be optionally present which allows the consumer to adjust the temperature of the house (22). A remote unit wireless communication means (14G) is electrically connected to the remote unit microprocessor (14A) which allows a fuel company at a remote location to monitor the exact level of fuel (18) within the fuel tank (16A, 16B).

It will be understood that each of the elements described above, or two or more together, may also find a useful application in other types of constructions differing from the type described above.

While the invention has been illustrated and described as embodied in a wireless remote fuel gauge, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wireless remote fuel gauge (10) comprising:
   A) at least one tank gauge (12) positioned on a fuel tank (16A, 16B), the tank gauge (12) comprises:
      I) a tank gauge microprocessor/analog converter (12A) electrically connected to a tank gauge power line (12F),
      ii) a tank gauge transmitter (12B) electrically connected to the tank gauge microprocessor/analog converter (12A), the tank gauge transmitter (12B) functions to transmit, by radio frequency, a level of fuel (18) information within the fuel tank (16A, 16B),
      iii) a tank gauge indicator (12D) mechanically connected to a tank gauge microprocessor/analog converter (12A), the pre-existing tank gauge indicator (12D) functions to allow a consumer to visually monitor the level of fuel (18) within the fuel tank (16A, 16B), and
      v) a freely moving tank gauge float (12G), mechanically connected to the tank gauge microprocessor/analog converter (12A), maintains position on the level of fuel (18) within the fuel tank (16A 16B);
   B) at least one remote unit (14) in radio frequency communication with the tank gauge (12) is positioned within a house (22) preferably within a hallway (22A, 22B) adjacent to a pre-existing thermostat, the remote unit (14) comprises:
      I) a remote unit microprocessor (14A) electrically connected to a remote unit power line (14F),
      ii) a remote unit transmitter (14B) electrically connected to the remote unit microprocessor (14A), the remote unit transmitter (14B) functions to transmit, by a wireless communication means, a request for the level of fuel (18) information to the pre-existing tank gauge (12C),
      iii) a remote unit receiver (14C) electrically connected to the remote unit microprocessor (14A), the remote unit receiver (14C) functions to receive the level of fuel (18) information from the tank gauge transmitter (12B), iv) a remote unit indicator (14D) electrically connected to the remote unit microprocessor (14A), the remote unit indicator (14D) functions to visually exhibit the level of fuel (18) information to a user, and v) a remote unit wireless communication means (14G) electrically connected to the remote unit microprocessor (14A), the remote unit wireless communication means (14G) functions to receive therethrough a request for the level of fuel (18) from a fuel company and transmit therethrough the level of fuel (18) to the fuel company.

2. The wireless remote fuel gauge (10) as described in claim 1, wherein the remote unit indicator (14D) is selected from a group consisting of remote unit empty indicator (14DA), remote unit ¼ indicator (14DB), remote unit ½ indicator (14DC), a remote unit ¾ indicator (14DD), remote unit full indicator (14DE), and LCD numerical display.

3. The wireless remote fuel gauge (10) as described in claim 1, wherein the remote unit (14) further comprises a remote unit thermostat (14E) having a remote unit thermostat display (14EA).

4. The wireless remote fuel gauge (10) as described in claim 3, wherein the remote unit thermostat (14E) further comprises a remote unit thermostat adjustment means (14EB).

* * * * *